Sept. 4, 1951  H. R. HOWELL  2,566,492
CUTTING SHEARS
Filed Feb. 21, 1948  2 Sheets-Sheet 1
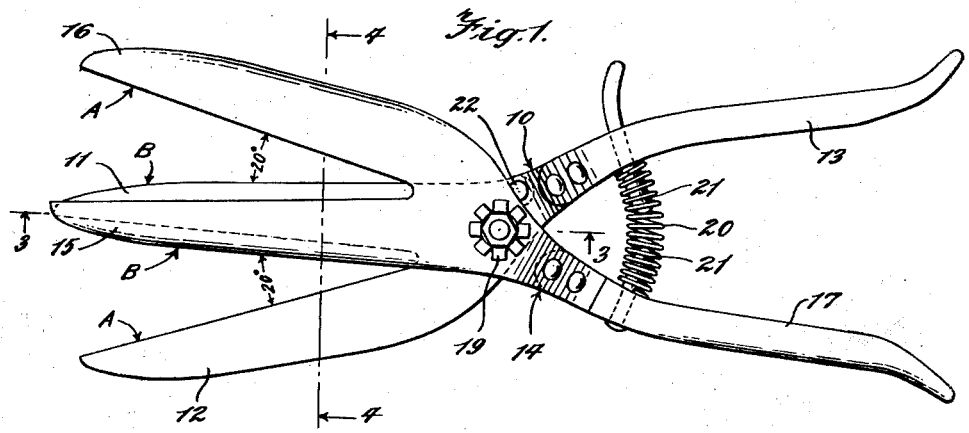
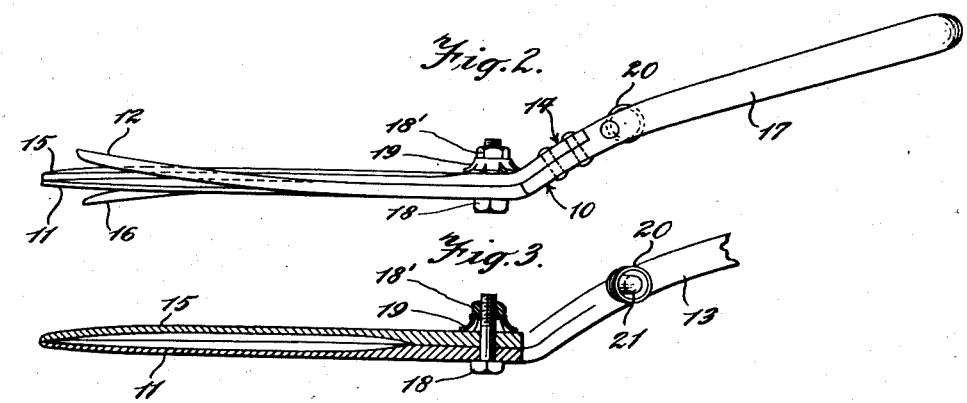
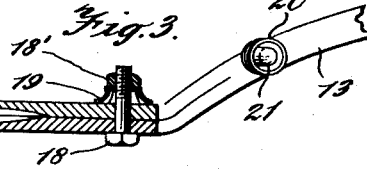
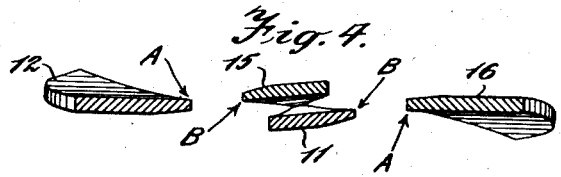
INVENTOR.
Herbert R. Howell
BY
Burgess, Ryan & Hicks
ATTORNEYS Sept. 4, 1951     H. R. HOWELL     2,566,492
CUTTING SHEARS
Filed Feb. 21, 1948     2 Sheets-Sheet 2
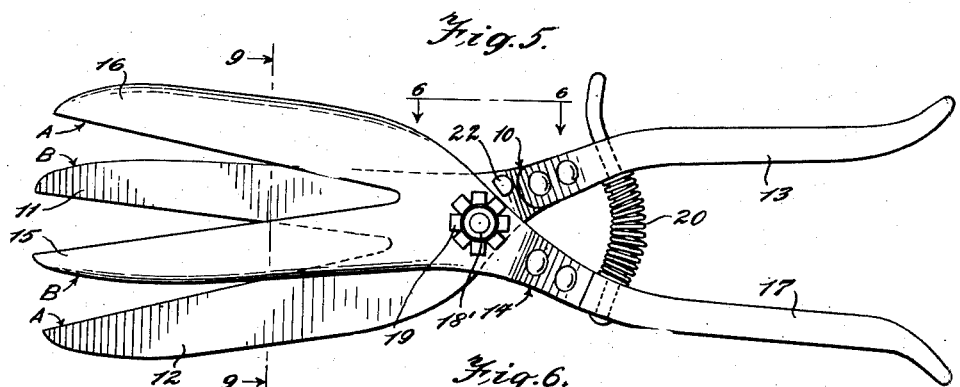
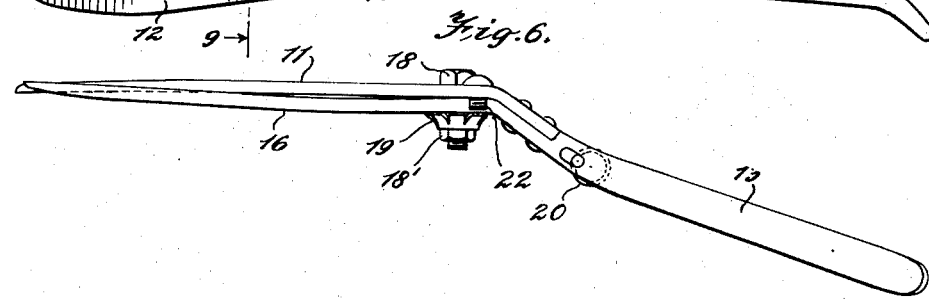
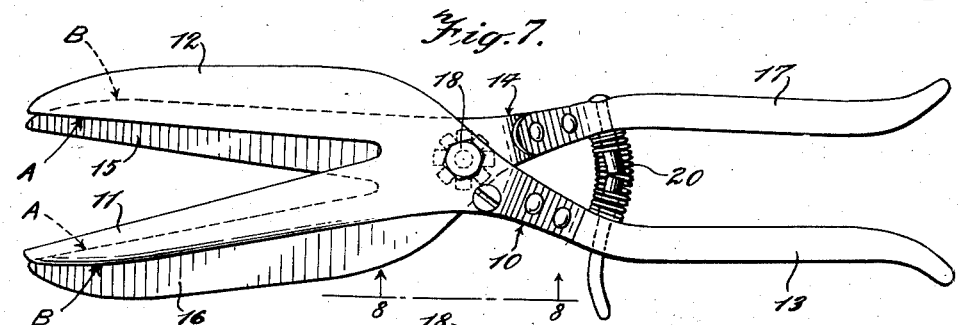
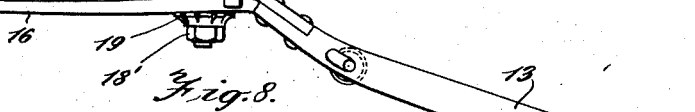
INVENTOR.
Herbert R. Howell
BY
Burgess, Ryan & Hicks
ATTORNEYS Patented Sept. 4, 1951

2,566,492

UNITED STATES PATENT OFFICE 2,566,492

CUTTING SHEARS

Herbert R. Howell, Summit, N. J.

Application February 21, 1948, Serial No. 10,089

6 Claims. (Cl. 30—213)

The present invention relates to cutting shears and relates more particularly to a cutting shears having four cutting blades.

The various objects and advantages of the invention will be apparent from the following description and the accompanying drawings in which:

Fig. 1 is a plan view of a cutting shears embodying the invention;

Fig. 2 is a side view of the cutting shears illustrated in Fig. 1;

Fig. 3 is a section view taken along the line 3—3 of Fig. 1;

Fig. 4 is a section view taken along the line 4—4 of Fig. 1;

Fig. 5 is a plan view of the cutting shears illustrated in Fig. 1 with the blades in partially closed position;

Fig. 6 is a side view of the shears illustrated in Fig. 5 as seen from the line 6—6;

Fig. 7 is a bottom view of the shears illustrated in Fig. 1 with the blades in fully closed position;

Fig. 8 is a side view of the shears illustrated in Fig. 7 as seen from the line 8—8; and Fig. 9 is a section view taken along the line 9—9 of Fig. 5.

The cutting shears illustrated are of the type usually operated with one hand for clipping and trimming grass or similar vegetation. It will be understood that shears embodying the invention may also be provided for two hand operation as in hedge clippers, etc. In the shears, as illustrated, the hand action or squeeze which results in the cutting is reduced to one-half of what it is for the customary two-bladed type of grass shears to cut an equal width of grass at a single clip. In other words, in the present shears, the points of the blades of the shears move only one-half the distance that would be required for an equivalent length of cut with the customary two-bladed shears. This permits women and persons with small hands to operate the present shears with comfort and ease that is not obtainable with the usual two-bladed shears where the handles must open and close to a greater distance for an equivalent cutting action. It also presents the raising of blisters on the hand of the user that can occur from the longer movement of the handles.

The present shears also reduce the hand action as in many instances they will cut a clump of grass with a single clip where several thrusts or clips would be required with the customary two-bladed shears. Also, in the shears embodying the invention the distance between the points of the blades is short relative to the length of the blade and the tendency for the grass to bend over or slide out of the blades as they are being closed is reduced, thus facilitating an even and level cutting of the grass.

As shown in the drawings there is an operating member, indicated generally by the numeral 10, that carries a pair of spaced cutting blades 11 and 12 and has a handle portion 13 that is shaped to fit the hand. A second operating member, indicated generally by the numeral 14, also carries a pair of spaced cutting blades 15 and 16 and has a handle portion 17 that is shaped to fit the hand.

The operating members 10 and 14 are pivoted on a lever bolt 18 with the cutting blades and handles of the respective members in crossed relation to each other. The operating members 10 and 14 are held with their respective blades in proper operating position relative to each other on the lever bolt 18 by a nut 18' that is threaded on to the end of the bolt 18. The nut 18' bears against a resilient member 19 in the form of a spring washer that engages with one of the operating members. The resilient member 18 permits the operating members 10 and 14 to adjust themselves relative to each other by moving apart or tilting slightly as their blades are being closed.

When the operating members 10 and 14 are in assembled relation, the blades 11 and 15 carried by the operating members 10 and 14, respectively, constitute the inner blades of the shears and are in overlapping relation. As shown best in Figs. 3 and 4, the opposed surfaces of the blades 11 and 15 are spaced apart by their opposed surfaces being sloped away from each other. This prevents any clippings that adhere to the blades from fouling the blades and preventing the shears from opening fully. The blades 12 and 16 carried by the operating members 10 and 14, respectively, constitute the outer blades of the shears. The outer blades 12 and 16 have cutting edges, indicated generally at A, that cooperate, respectively, with cutting edges, indicated generally at B, of the inner blades 15 and 11.

As shown best in Figs. 3 and 4, each of the outer blades 12 and 16 is inclined or curved so that its plane extends across the plane of the inner blade with which it cooperates. Thus, when the shears are being closed, as that illustrated in Fig. 5, there are three points of contact; i. e., two sliding points of contact where the respective inner and outer blades touch at their cutting edges and one point of contact behind the lever bolt 18 in the direction of the handles 13 and 17, otherwise the moving parts do not touch. Since the connection of the operating members through the lever bolt 18 is flexible because of the action of the resilient member 19, the triangle of three contact points is maintained throughout the movement of the blades. The pressure on the operating members is adjusted so that the two sliding points of contact will be maintained as touching at all times and therefore both sets of blades of the shears will be self-adjusting and self-sharpening.

A coiled spring 20 is held in place between the handles 13 and 17 by pins 21 and normally urges the handles apart so that the blades will return automatically to their open position when the handles are released. A stop 22 carried by the operating member 10 engages with the opposed operating member 14 and prevents the blades from moving beyond their fully open position.

It will be understood that various modifications and changes may be made in the illustrated embodiment invention by those skilled in the art without departing from the scope of the invention as defined by the appended claims.

I claim:

1. In a cutting shear of the type adapted for operation by one hand, the combination which includes a pair of spaced single edged cutting blades, a second pair of single edged cutting blades pivotally secured to said first pair of blades, said pairs of blades each having an inner and an outer blade and being positioned with the cutting edge of the inner blade of each pair cooperating with the cutting edge of the outer blade of the other pair, said inner blades overlapping each other when the shear is open and having their opposed overlapping surfaces spaced apart and a handle secured to each pair of blades for opening and closing the shear, said handles being spaced apart a distance suitable for gripping by one hand of an operator when the shear is open.

2. In a cutting shear of the type adapted for operation by one hand, the combination which includes a pair of spaced single edged cutting blades, a second pair of single edged cutting blades pivotally secured to said first pair of blades, said pairs of blades each having an inner and an outer blade and being positioned with the cutting edge of the inner blade of each pair cooperating with the cutting edge of the outer blade of the other pair, said inner blades overlapping each other when the shear is open and having their opposed overlapping surfaces spaced apart, a resilient member acting on said blades at the point at which said blades are pivotally connected, said resilient member permitting said blades to move relative to each other while maintaining contact at two spaced points between the cooperating inner and outer blades of the respective pairs of blades during operation of the shear and a handle secured to each pair of blades for opening and closing the shear, said handles being spaced apart a distance suitable for gripping by one hand of an operator when the shear is open.

3. In a cutting shear of the type adapted for operation by one hand, the combination as defined in claim 2 wherein the plane of the outer blade of each pair of blades extends across the plane of the inner blade of the other pair of blades.

4. In a hand-operated shear for clipping grass or the like the combination of a pair of operating members extending across each other and being pivotally secured together at the point where they cross, a pair of spaced cutting blades carried by each of said members at one end thereof, each of said blades having a single cutting edge extending along one side thereof and entering into cutting engagement with one of the blades on the other member upon pivotal movement of the operating members in one direction with the plane of one of the blades of each set of blades extending across the plane of the other blades at their cutting edges, handles carried at the other end of each of the operating members, said handles being spaced apart a distance permitting them to be gripped in one hand and being movable toward each other by a squeezing action of the hand in moving said members in said one direction and resilient means holding said members in opposing relation at their pivot point, said means permitting a tilting movement of the operating members relative to each other under the influence of the engagement of the cutting blades during pivotal movement of the members in said one direction.

5. In a shear operable by one hand for clipping grass or the like, the combination which includes a pair of operating members extending across each other and being pivotally secured together at the point where they cross, an inner and an outer cutting blade carried at one end of each of said operating members, said blades being movable between open to closed positions by pivotal movement of the operating members, the inner blade of one member overlapping the inner blade of the other member when the blades are open, each of the blades having a single cutting edge extending along one side thereof, the cutting edge on the outer blade of each of the members being positioned to enter into cutting engagement with the cutting edge on the inner blade of the opposing member upon movement of the blades from open to closed position, at least one blade of each set of opposing inner and outer blades extending across the plane of the opposing blade at their cutting edges, a handle carried by each of the operating members at the other end thereof, said handles being spaced apart a distance permitting them to be gripped by one hand when the blades are open and resilient means holding the operating members in opposing relation at their pivot point, said means permitting tilting movement of the operating members with respect to each other and maintaining the cutting edges of the opposing blades in cutting engagement upon pivotal movement of the operating members.

6. In a shear operable by one hand for clipping grass or the like, the combination which includes a pair of operating members extending across each other and being pivotally secured together at a point intermediate their ends, an inner and an outer cutting blade carried at one end of each of said operating members, said blades being movable between open and closed positions by pivotal movement of the operating members, the inner blade of one member overlapping the inner blade of the other member and being spaced therefrom when the blades are open, each of said blades having a single cutting edge extending along one side thereof, the cutting edge on the outer blade of each of the members being positioned to enter into cutting engagement with the cutting edge on the inner blade of the opposing member upon movement of the blades from open to closed position, at least one blade of each set of opposing inner and outer blades extending across the plane of the opposing blade at their cutting edges, a handle carried by each of the operating members at the other end thereof, said handles being spaced apart a distance permitting them to be gripped by one hand when the blades are open, resilient means holding the operating members in opposing relation at their pivot point, said means permitting tilting movement of the operating members with respect to each other and maintaining the cutting edges of the opposing blades in contact upon pivotal movement of the operating members and resilient means normally holding the operating members in a position where the blades are open.

HERBERT R. HOWELL.

REFERENCES CITED

The following references are of record in the file of this patent:

UNITED STATES PATENTS

| Number | Name | Date |
|---|---|---|
| 136,209 | Borden | Feb. 25, 1873 |
| 1,533,479 | Stitt | Apr. 14, 1925 |
| 1,870,025 | Rauh | Aug. 2, 1932 |
| 1,941,718 | Rasmussen | Jan. 2, 1934 |
| 1,993,360 | Ciocia | Mar. 5, 1935 |
| 2,281,977 | Keiser | May 5, 1942 |